(12) United States Patent
Brzoskowski et al.

(10) Patent No.: US 6,242,502 B1
(45) Date of Patent: Jun. 5, 2001

(54) FOAMED THERMO-ELASTIC ARTICLE

(75) Inventors: Ryszard Brzoskowski, Acton; Yundong Wang, Leominster; Christopher La Tulippe, Fitchburg, all of MA (US); Robert Dion, Hollis, NH (US); Cai Hua, Acton, MA (US)

(73) Assignee: DSM N.V., Herleen (NL)

( * ) Notice: Subject to any disclaimer, the term of this patent is extended or adjusted under 35 U.S.C. 154(b) by 0 days.

(21) Appl. No.: 09/378,918

(22) Filed: Aug. 23, 1999

Related U.S. Application Data

(63) Continuation of application No. PCT/NL98/00010, filed on Feb. 19, 1998.
(60) Provisional application No. 60/038,298, filed on Feb. 21, 1997, and provisional application No. 60/062,206, filed on Oct. 16, 1997.

(51) Int. Cl.$^7$ ............................................ C08J 9/06
(52) U.S. Cl. .............................. 521/92; 521/79; 521/81; 521/139; 521/140
(58) Field of Search ................................. 521/79, 81, 92, 521/139, 140

(56) References Cited

U.S. PATENT DOCUMENTS

| | | | |
|---|---|---|---|
| 4,029,612 | * 6/1977 | Collingston | 521/79 |
| 4,226,911 | 10/1980 | Haren . | |
| 4,407,768 | * 10/1983 | Garcia et al. | 521/79 |
| 4,446,254 | * 5/1984 | Nakae et al. | 521/79 |

FOREIGN PATENT DOCUMENTS

| | | |
|---|---|---|
| 36 03 451 | 8/1987 | (DE) . |
| 503 220 A1 | 10/1991 | (EP) . |
| 1 436 602 | 7/1966 | (FR) . |
| 903564 | 8/1962 | (GB) . |
| 52-148 603 | 10/1977 | (JP) . |

OTHER PUBLICATIONS

Database WPI Section Ch, Week 9104 Derwent Publications Ltd., London, GB; Class A17, AN 91–026357 XP002063279 & JP 02 296 841 A (Furukawa Electric Co Ltd), Dec. 7, 1990.

Database WPI Section Ch, Week 8003 Derwent Publications Ltd., London, GB; Class A12, AN 80–04604C XP002038320 & SU 659 585 A (Zinchenko A V ), Apr. 30, 1979.

Database WPI Section Ch, Week 8604 Derwent Publication Ltd., London, GB; Class A11, AN 86–025670 XP002038321 & JP 60 248 751 A (Toyoda Gosei KK), Dec. 9, 1985.

Database WPI Section Ch, Week 8911 Derwent Publications Ltd., London, GB, Class A17, AN 89–082922 XP002038319 & 63225641 A (Sumitomo Bakelite Co ) Sep. 20, 1988.

Stoeckhert, Kunststoff Lexikon, 8$^{th}$ Ed. [1992], Carl Hanser Verlag, München, pp. 594–597.

Plueddemann, Silane Coupling Agents [1982], Plenum Press, New York, p. 31.

* cited by examiner

*Primary Examiner*—Morton Foelak
(74) *Attorney, Agent, or Firm*—Pillsbury Winthrop LLP

(57) ABSTRACT

The invention relates to a process for preparing a foamed thermoplastic elastomeric article, comprising the following steps:

heating a mixture comprising a thermoplastic elastomer selected from the group comprising styrene based thermoplastic elastomers and thermoplastic polyolefin elastomers, and an effective amount of a water releasing chemical compound, to a temperature at which the water releasing chemical compound releases water, which is above the melting point of the thermoplastic elastomer, and releasing the resulting heated mixture to atmospheric conditions.

The invention also relates to a foamable polymeric composition as well as to a foamed thermoplastic elastomeric article.

29 Claims, No Drawings

FOAMED THERMO-ELASTIC ARTICLE

This application claims the benefit of U.S. Provisional Application 60/038,298 filed Feb. 21, 1997, and U.S. Provisional Application 60/062,206 filed Oct. 16, 1997 and a continuation of PCT/NL98/00010 filed Feb. 19, 1998.

FIELD OF THE INVENTION

The present invention relates to a process for preparing a foamed thermoplastic article from a thermoplastic elastomer.

PRIOR ART

Such a process is known from EP-A-40,934, in which a blend of a polyolefin resin and a rubber is foamed by the use of either chemical or physical blowing agents.

A drawback of such a process is that the proposed blowing agents (e.g. chemical blowing agents, (such as azodicarbonamides), or physical blowing agents, (such as chlorofluorocarbons or low boiling hydrocarbons)) have all their disadvantages, like inefficiency, and more in particular the detrimental influence on the ozon-layer of the earth-atmosphere.

It has been proposed to use gases, like $N_2$ or $CO_2$, as an alternative, but they are difficult to be mixed in thermoplastic elstomers.

In the prior at the use of liquid water as a blowing agent is known. WO-92/18326 as well as EP-A-503,220 describe a process for the preparation of foamed thermoplastic elastomers in which the thermoplastic elastomer is heated to a temperature above its melting point, after which water is added to the melted thermoplastic elastomer and the mixture is released to atmospheric pressure.

Such a process has a lot of drawbacks: the liquid water is injected and mixed with the thermoplastic elastomer; the process results in a non-uniformity of the resulting foam: large and irregular shape of the foam, as well as surface roughness. Such a process also requires special equipment for the mixing of the ingredients and the metering of the water.

SUMMARY OF THE INVENTION

The process of the present invention provides a solution for the above problems. The invention concerns the preparation of a foamed thermoplastic article from a thermoplastic elastomer (TPE), in which the thermoplastic elastomer is selected from the group comprising styrene based thermoplastic elastomers (hereinafter also abbreviated as "STPE") and thermoplastic polyolefin elastomers (hereinafter also abbreviated as TPOE).

The present process comprises the following steps:
a) heating a mixture of the TPE and an effective amount of a water releasing chemical compound (WCC), to at least a temperature at which the WCC releases water, which is above the melting point of the TPE, and
b) releasing the resulting heated mixture to atmospheric conditions.

Here and hereinafter the term "WCC" means any chemical compound or a mixture of chemical compounds that are capable of releasing water at elevated temperatures. In that sense different types of WCC are applicable according to the present invention; examples thereof are:
1) metal salts of groups 1 or 2 of the Periodic Table (CRC Handbook of Chemistry & Physics, 1990), wherein the anion is a phosphate, chromate, sulfate, borate or the like, said salts containing hydrate water. Suitable salts include, for instance, magnesium sulfate dihydrate, magnesium sulfate heptahydrate, calcium sulfate dihydrate, potassium citrate monohydrate, tricalcium phosphate monohydrate, sodium perborate tetrahydrate, barium acetate monohydrate and barium borate heptahydrate, among others;
2) metal hydroxides which decompose at elevated temperature, releasing water. Suitable, water-releasing metal hydroxides include, among others, aluminum trihydrate (ATH), also known as aluminum trihydroxide $(Al(OH)_3)$, and magnesium hydroxide $(Mg(OH)_2)$;
3) organic di-acids, which can be transformed to their anhydride equivalent. An example of this are succinic acids, having the formula

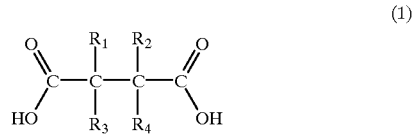

which can be converted to the anhydride

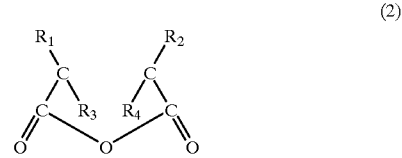

In these formulae (1) and (2) $R_1$–$R_4$ can, each independently, be hydrogen, an alkyl group having 1–20 C-atoms or a halogen group.
4) a mixture of ingredients that generate water through a polycondensation reaction. Suitable water-releasing polycondensable mixtures include a mixture of an organic α-ω diamide and an organic α-ω-diacid which react during the polycondensation to form a polyamide. For instance, the reaction of 1,4 diamino butane with adipic acid under the formation of Nylon 4,6; and the reaction of 1,6 diaminohexane with adipic acid under the formation of Nylon 6.6, will release water.

Another suitable form of polycondensation reaction is the formation of a polyester.

The use of such a type of WCC not only results, during the foaming process of the TPE, in a release of water, but also in the formation of a nylon or an polyester phase in the TPE and therewith influencing the properties of the foamed article by their presence in the final article.

In the process of the present invention the WCC may only release its water (at least in substantial amounts) at a temperature at or above the melting point of the TPE, as a result of which the TPE is melt processable. The water release temperature may on the other hand be not so high, that such temperature is detrimental for the thermoplastic elastomer to be foamed. The appropriate WCC can therefor be selected upon choosing the TPE to be foamed (and therefor knowing the range of the temperature in which the TPE can be processed (for instance the melting point and the decomposition temperature of that TPE)). Analytical instruments like DTA (differential thermal analysis), DSC (differential scanning calorimetry) or TGA (thermogravimetric analysis) can be used to determine the suitability of a potential WCC for the intended purpose.

DETAILED DESCRIPTION OF THE INVENTION

The mixture of the TPE with the WCC, as used in the present invention, can be made according to several processes:

a) the TPE and the WCC can be dry blended, and added as a blend to the equipment in which the foaming takes place;

b) the WCC and the TPE can be mixed at a temperature above the melting point of the TPE, but below the temperature at which the WCC releases its water. Thereafter this melt mixture can either be processed to pellets (by for example extrusion and cooling), or directly processed into a foaming equipment. The melt-mixing of the WCC and TPE as well as the foaming of the TPE can take place in one apparatus, provided that the melt mixing and the foaming take place under different temperature conditions to avoid premature release of water before a thorough mixing and dispersion of the WCC in the TPE has taken place.

The thermoplastic elastomer (TPE), applicable in the process of the present invention, can be either a styrene based thermoplastic elastomer (STPE) or a thermoplastic polyolefin elastomer (TPOE), or, especially for low hardness products, mixtures thereof.

The STPE is a styrene block copolymer of the form A-B-A, in which A is a polystyrene chain and B a diene chain, such as polybutadiene or polyisopropene. The polystyrene may also be based on substituted styrenes, like α-methylstyrene. The styrene/diene molar ratio generally ranges from 50/50 to 15/85.

A preferred form of STPE is at least one of styrene-butadiene-styrene blockcopolymers (SBS) and their partially or fully hydrogenated derivatives (SEBS).

The TPOE is a family of thermoplastic elastomers comprising a blend of a (semi-)crystalline polyolefin resin and a rubber dispersed in said resin. In general these blends comprise from 15–85 parts by weight of polyolefin resin and correspondingly from 85–15 parts by weight of rubber.

The polyolefin in such a TPOE can be one or more polyolefins originating from a (co-)polymerisation of α-olefins, such as ethylene, propylene, butene-1 and otaers, as well the crystalline polycycloolefins. They have to behave like a thermoplastic and have a DSC crystallinity of at least 15%. A preference is present for homo- and copolymers of polyethylene and polypropylene; in the case of copolymers of said polyolefins the content of ethylene resp. propylene in said copolymer is at least 75 wt. %.

The rubber in the TPOE used according to the invention can be any rubber known in the art, provided that the rubber is stable under the foaming conditions. Rubbers useful are butylrubber (copolymer as well as terpolymers, and also in its halogenated form); ethylene/α-olefin copolymer rubber (EAM) as well as ethylene/α-olefin/diene terpolymer rubber (EADM); acrylonitrile/butadiene rubber (NBR); styrene/butadiene rubber (SBR); natural rubber (NR); the rubber can also be an STPE, as described before. In case of EAM or EADM rubber, the α-olefin in such a rubber is preferably propylene; in such a case the rubber is referred to as EP(D)M. It is also possible to use a mixture of such rubbers.

With more preference the TPOE is a thermoplastic polyolefin vulcanizate (TPOEV), in which the dispersed rubber is at least partially cured (i.e. vulcanized). Here and hereinafter a TPOE is called a TPOEV when the rubber in the TPOE has a degree of vulcanization such that the amount of extractable rubber is less than 90%. The test to determine such an extractable amount is generally done with a solvent in which the polyolefin as well as the not-vulcanized rubber are soluble, but in which the vulcanized rubber is not soluble. A suitable solvent is boiling xylene.

By vulcanizing the rubber in a TPOE, the physical properties of the resulting TPOEV, as well as the physical properties of the resulting foamed article are improved.

The vulcanization of the rubber in a TPOE can be performed with any vulcanization system that is known in the art to vulcanize the rubber in the TPOEV. In the case of EA(D)M-rubber sulphur systems, peroxide systems and preferably vulcanization systems based on a phenolic resin are used.

To enjoy the best effects of the vulcanization, the TPOEV is preferably vulcanized to the extend that the amount of extractable rubber is less than 15%, more preferred even less than 5%.

Preferably, the TPOEV is prepared in a dynamic vulcanization process, which as such is known in the art. Alternatively, vulcanized rubber particles (preferably having a size below 10 $\mu$, more preferred below 1 $\mu$) can be mixed in the (semi-)crystalline polyolefin.

The use of the WCC in the process for preparing a foamed thermoplastic article according to the invention enables the skilled man to perform a very controlled foaming process.

The amount of water released from the WCC is a function of the temperature and the residence time in the foaming process. For that reason the foam density can be easily controlled; the same composition can be used to make polymer foams of different densities. As care is taken in the process according to the invention to prepare a good dispersion of the WCC in the TPE, the WCC does not only act as a source of the blowing agent, but also acts as a nucleating agent which gives very fine and uniform cell structure.

To achieve the good dispersion of the WCC, the WCC, when in solid form added to the TPE, must be in the form of fine, small, dispersable particles. Generally the particle size is in the range of 0.01–100 $\mu$m and more preferably the WCC has a particle size below 50 $\mu$m. This results in a large number of well dispersed nucleating sites within the TPE.

The foaming process can be performed in any equipment that is known and suitable for foaming of a thermoplastic elastomer. This can be done either in a static process, as well as in a dynamic process. In the first case, mentioning can be had to foaming in a predetermined shape, or thermoforming by the use of a heated shape. In these cases, the TPE is locally heated to the foam temperature and is thus foamed.

By preference an extruder is used. When the same equipment is used for both the mixing process of the WCC and the TPE, as well as for the foaming process, care has to be taken that the TPE is first melted and thoroughly mixed with the WCC to obtain, preferably an at least substantial, uniform distribution of the WCC in the TPE; the temperature is then raised to at least a temperature at which the WCC releases water, the resulting mix is extruded, e.g. through a die, and a foamed TPE is obtained.

In the mixing part of the process (i.e. the mixing of the TPE and the WCC), whether this is a separate process, or integrated with the foaming process, the temperature should be carefully controlled in order to prevent premature release and volatilization of the water. When the mixture is then heated to conditions where water is released from the WCC and whereafter the pressure is released, the TPE expands to a foamed article.

The mixing of the WCC with the TPE generally takes place at any temperature between 0° C. and the temperature at which the WCC starts to release water. This water-release temperature, if not already known from literature, can easily be determined by analytical instruments as DTA, DSC and TGA. The temperature at which the mixing of the WCC with the TPE takes place depends on the type of mixture aimed at: a dry blend or a melt blend. In the last case the mixing temperature is above the melting point of the TPE but below the temperature at which the WCC releases water. In general it is preferred that the mixing of the TPE with the WCC takes place at a temperature within the range of 10–250° C. and that the water is released at a temperature within the range of 120–350° C. (provided that the mixing temperature is below the water-release temperature).

Standard single screw extruders with a good heating and cooling system can be used to make TPE foam profiles. Electric heating and air cooling system is preferred because of its ease of use. The size of the extruder needed depends on the cross sectional area of the profile and the through put rate required. For a typical automotive seal profile, an extruder with a 60 to 90 mm diameter screw is preferred. A screw with a minimum 24:1 L/D ratio is preferred. The screw can be a general-purpose screw with a compression ratio of 3:1, a low work barrier screw or other types of screws commonly used for processing of TPE's. A static mixer or a similar device can also be used to increase the residence time of the composition being processed. The extrusion dies should be designed such that high pressure is maintained in the melt for as long as possible to prevent the premature foaming of the composition in the extruder and in the die.

Extrusion foaming of a TPE consists of three fundamental steps: bubble initiation (nucleation), bubble growth, and stabilization. Nucleation sites are provided mainly by blowing agent particles dispersed within the polymer melt. Nucleation occurs when the melt pressure drops below the vapor pressure of the blowing agent. To achieve low density foams with small uniform cell structure and a smooth skin it is necessary to move the nucleating point as close as possible to the exit of the die. This can be accomplished by using a die with a sharp converging geometry and short land length. The presence of particles of the WCC is very important to the process. They provide control of cell size and their distribution. The use of the pre-compounded blowing agent produces a uniform distribution of blowing agent within the polymer melt and produces even cell distribution. Once the cells have nucleated, they continue to grow. The driving force for their growth is the pressure difference between the internal vapor pressure and the ambient pressure. The growth will continue until the bubbles stabilize or rupture. Bubbles are stabilized by the rapid rise in polymer viscosity which is caused by loss of heat by the cooling process. A water bath cooling system with a belt puller can be used for foam profiles with densities higher than 300 kg/m$^3$. For foam profiles with densities lower than 300 kg/m$^3$, the water bath cooling system may induce uneven shrinkage of the profiles. In such cases, air and/or water mist spray cooling systems with a long conveying belt are preferred. FIG. 1 shows schematically an extruder for the foaming of a TPE with ATH, for which the typical indicated temperature profiles apply:

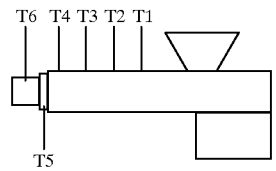

(FIG. 1)

T1: 180° C.–200° C.
T2: 200° C.–260° C.
T3: 240° C.–280° C.
T4: 158° C.–190° C.
T5 (adapter): 158° C.–190° C.
T6 (die): 160° C.–190° C.

The man skilled in the art can easily adjust the configuration of the temperature setting of the extruder, when using another type of foaming agent.

Preferably the temperature profile of the barrel is set in such a way that T1 and T4 are lower than T2 and T3. Some single screw extruders with a smaller L/D ratio (such as 24:1) may have only three heating zones on the barrel. The temperature profiles of these extruders and the extruders attached with a static mixer or a similar device should be set such that the middle zone of the extruder has the highest temperature profile. The temperature of the die should be set to a point low enough to ensure a high head pressure and high enough to provide a smooth profile surface. The head pressure should be kept roughly above 3.5 MPa to prevent premature foaming of the composition in the extruder and in the die. The head pressure is effected by the melt temperature and the throughput rate. It can be adjusted by changing the barrel temperature settings in zone 4 (T4) and in the die (T6), and the screw speed. The most powerful parameter effecting the head pressure is the barrel temperature in zone 4 (T4) and the die temperature.

The foam density depends on the temperature in the middle zone of the extruder and on the screw speed. The higher that temperature and the lower the screw speed, the lower the foam density that can be achieved. In principle, foams of different densities ranging from 150–900 kg/m$^3$ can be achieved by changing the extrusion temperature profile and adjusting the screw speed.

The screw speed is generally in the range of 10 to 50 rpm depending on the throughput rate, the screw design, size of the extruder and the density of the foam to be produced. In general, the screw speed should be set at the lower end of the range if possible to maximize the residence time of the foamable composition in the barrel. An extrusion throughput rate 5–40 kg/hr with an extrusion line speed of 3–30 m/min. can be achieved with a 60 to 90 mm diameter single screw extruder. The actual throughput rate and the line speed depend on the foam density, the screw speed, the cross sectional area of the profile, the foaming conditions, the screw geometry, and the die design.

The following procedure can be used as a general guideline for adjusting the foam density of a TPOE product based on a TPOEV, using ATH as the WCC. The skilled man can easily adjust the condition for other specific TPE's and other WCC's. It can also be used to generate a calibration curve of foam density vs. processing conditions for a new extrusion line or a new die.

1) Set the temperature profile of the extruder barrel as a starting point: T1=190° C., T2=230° C., T3=245° C., T4=165° C., T5=165° C., and T5=175° C.;

2) Add the TPOE to the hopper and run the extruder for about 30 min, and then take a foam sample for density measurement. It is always recommended to start the foaming process with higher foam density and decrease the foam density gradually by increasing the temperature settings in the middle zones of the extruder;
3) If the foam density is higher than the desired value, increase the temperatures at the second and the third zones by about 2 to 10° C. depending on how far away the density is from the desired value. If the foam density is lower than the desired value, lower the temperatures at the second and the third zones slightly. Wait for 20 to 30 min after the temperature reach the new set points. Collect another foam sample and measure the density again. Sometimes, it may take longer than 30 min to stabilize the foaming process after a drastic change of the temperature profile.
4) Repeat step 3 until the desired foam density is reached. Sometimes a small change in the other zones or at the die may be needed to fine-tune the foam density and product quality.

The amount of WCC used in the process according to the invention depends on the density of the foam to be prepared, but of course also on the amount of water which can and is released per unit weight of WCC. The more water is released per unit weight of WCC, the less WCC is needed for a given foam density. On the other hand, there is no need for the WCC to release all its potential water.

In cases where the WCC is capable of exhibiting additional beneficial properties, e.g. also an activity as a flame retardant (like ATH, as an example), there is no requirement that all the WCC is decomposed during the foaming process. As a result a foamed article with improved flame retardancy is obtained. To obtain a flame-retardant foamed article it is also possible to use a combination of a WCC, which behaves like a flame retardant, and standard flame retardants, known in the art.

Surface treatment of the WCC can also influence the foaming process and the physical properties of the foamed article. Improvement of the properties can be obtained by the use of a WCC which is treated with a surface coating and/or surface coupling agents. Surface treatment of fillers in polymers is already known (see U.S. Pat. No. 4,525,494) for long. It has now been found that also the properties of foam made of a TPE are markedly improved by the use of such surface coating and surface coupling agents. Beneficial effects can be had with a WCC, which is surface coated with a silane coupling agent, being an organosilicon compound having the formula:

in which R is a hydrolysis-insensitive organofunctional group, and each X is a hydrolyzable group which can be converted on hydrolysis to a silanolgroup. In general the R-group comprises a functional hydrocarbon group, being substituted with a functional group, like an amino, (meth-) acrylate, stryrylamine, epoxy, or halogengroup. The X-group preferably is an alkoxy or acetoxy group, more preferably a methoxy group. Reference can be made to the brochure "A Guide to Dow Corning Silane coupling agents" for that type of silane, suitable for the surface treatment of the WCC.

It has been found advantageous to treat the WCC with a vinylsilane (a vinyl substituted organo silicon compound), which addition improves the melt-strength of the foamed article. Examples of such vinylsilanes are vinyltrimethoxysilane and vinyltriacetoxysilane. Preferably a vinylalkoaysilaz is used.

Use can also be made of a WCC which is surface coated with an organotitanate, an organo zirconate or an organoaluminate coupling agent (like the alkoxy-, neo-alkoxy and cycloheteroatom derivatives thereof).

Examples of titanates useful as surface coating are monoalkoxy dioctyl pyrophosphato titanate, neoalkoxy dioctyl pyrophosphato titanate, and the acetylacetonate based titanates. For more information, reference is given to the manual of Kenrich Petrochemical, Inc., "Ken-React Reference Manual—Titanate, zirconate and aluminate coupling agents", by Salvatore J. Monte (1985/1987). This manual also discloses several of such coupling agents, suitable for surface coating of the WCC, used in the present invention.

During the foaming process the amount of released water must be sufficient to effect foaming, such as an amount in the range of 0.1–5 wt. %, relative to the TPE.

If and when desired, it is of course possible to use, in combination with the WCC, a conventional chemical or physical blowing agent, like $CO_2$, $N_2$, liquid hydrocarbon or azodicarbonamide.

When a process according to the invention is used to prepare a foamed TPOEV, it is preferred that the vulcanization of the TPOEV is (at least almost) completed before the foaming process takes place. Otherwise it can be the case that the foaming process has too much influence on the vulcanization process to obtain acceptable foamed TPOEV articles.

The pressure at which the foaming process takes place is not different from the pressure-range at which conventional foaming of TPE takes place.

At the end of the foaming process according to the present invention, the mixture comprising the TPE and the released water is released to atmospheric conditions, preferably combined with a shaping operation (like the formation of a shaped foamed profile). Here and hereinafter the term "atmospheric conditions" means a pressure having a value of about 0.1 MPa, but the foaming process can also be concluded at a release pressure which is somewhat lower or higher than 0.1 MPa.

The thermoplastic elastomers used in the process according to the present invention can also contain other ingredients for adjusting the physical properties of the foamed article. The rubber in the TPOE can contain extender oil, the TPE can contain additionally waxes, fillers, colorants, antidegradants, UV stabilizers and the like.

The invention also relates to a foamable polymeric composition, comprising a TPE, selected from STPE and TPOE, and an effective amount of a WCC. Here- and hereinafter the term "effective amount" is to be understood as the amount of WCC, which is capable of releasing the desired amount of water for the foaming process. This desired amount of water is, as indicated before, generally in the range of 0.1–5 wt. %, relative to the TPE.

The invention also relates to a foamed thermoplastic article, prepared by foaming a mixture comprising a TPE, selected from STPE and TPOE, and an effective amount of a WCC. Such a foamed article preferably has a density in the range of 50–900 kg/m³. The foam density can be controlled, e.g. target densities attained, by judicious selection of WCC, water-release temperature and the residence time in the foaming equipment.

Thezifame[]d articles, prepared according to the process of the present invention, have controlled closed cell structures throughout profiles, tubes, sheets and the like, with a smooth surface. The so prepared foams can be combined with other (foamed) TPE's, and traditional thermoset systems used throughout the automotive, construction, appliance, marine, sports equipment and electronic industries. It can also be combined with rubbers, or (reinforced) polyolefins. The foams of the present invention offer a large opportunity for use in the automotive industry for door, window, and hood seals.

The foam, prepared in the process of the present invention, can be used for several purposes: weight reduction; vibration reduction; energy absorption; sealing; friction improvement; cushioning; insulation (thermal, acoustic, as well as electrical); intumescent foams.

Applications in which the present technology can be used are e.g.: belt strips; patch seals; soft touch (knobs-grips); sunvisors; vent seals; carpet backing; headliners; seating; run flat tires; sporting pads; wet suits; footwear; first aid equipment; fabric backing; diapers; tapes; different toys; blankets/pads; luggage; ducting; floats/bumpers; band-aid; ear plugs; cups; pads/mattresses; office furniture.

The foaming process of the present invention can be used in different forms: extrusion; injection molding; thermo foaming; blow molding; rotational molding; foam casting. The foaming process of the present invention can also be used for co-extrusion of foam parts with solid parts, or for coating of foamed profiles with a solid polymer skin, which provides improved tear strength and low coefficient of friction.

The foam structure can be either uniform (i.e. bulk foaming) or also selective by applying a foam gradient, or a foamed region (constrained by pressure or foamed locally by focused energy).

The ingredients present in the foamable polymeric composition as well as in the foamed thermoplastic article according to the invention have been described above.

The invention will be elucidated by the following examples, which are intended to demonstrate, but not to restrict, the invention. The physical properties of the samples were measured according to the following ASTM-norms:
density: ASTM D792
tensile strength: ASTM D412
Elongation at break: ASTM D412
Compression set: ASTM D395
Compression load deflection: ASTM D1056

EXAMPLE I

This example shows the weight loss of ATH during a TGA heating scan, beginning at room temperature and heated with the indicated heating rate to the indicated final temperature.

TABLE 1

| Final Temperature, ° C. | Weight loss, wt. % at 20° C./min heating rate | Weight loss, wt. % at 5° C./min heating rate |
| --- | --- | --- |
| 230 | 0.0 | 1.4 |
| 250 | 1.0 | 4.0 |
| 260 | 2.5 | 7.0 |
| 270 | 5.0 | 11.0 |
| 280 | 8.0 | 17.0 |
| 300 | 17.0 | 27.0 |
| 350 | 31.0 | 31.0 |
| 530 | 35.5 | 34.4 |

This example shows that the amount of water, released from a WCC can be easily controlled, by selecting the proper temperature and proper heating rate.

EXAMPLES II–IV

A 34 mm intermeshing corotating screw extruder with a length to diameter ratio (L/D) of 35/1 was used to mix thermoplastic elastomer A (70 wt. %) with ATH powder (30 wt. %) at a melt temperature of 200° C. The resulting mixture (compound B) was used in the following foaming examples. The Sarlink® thermoplastic elastomer A was a blend of polypropylene and phenolic cured particulate EPDM rubber (TPV) in a ratio of rubber to plastic of about 63 to 37. The EPDM rubber had an amount of extractable rubber (in boiling xylene) of 10%.

A three zone single screw extruder equipped with a general purpose screw was used in the foaming examples. The extruder had a diameter of 38.1 mm and a length to diameter ratio (L/D) of 24/1. A circular die with a diameter of 1.5 mm was used. Compound B was fed to the extruder at a rate of 2.2–2.3 kilograms per hour. The temperature at the second zone of the extruder was varied from 240 to 260° C. in order to produce foams of different densities.

Density measurements were performed on the foamed samples. The cell size and uniformity were determined using optical techniques. As shown in Table 2, a series of foamed samples were obtained by changing the temperature setting at the second zone of the extruder. The higher the temperature at the second zone was set, the higher the rate of decomposition of ATH became, and thus the more water was released and the lower the density of the foam sample became. It was also found that the foaming process was very stable and easy to control even with an extruder of 24/1 L/D ratio. The foamed samples showed fine and uniform cell structures. The surface of the foamed strand was very smooth.

TABLE 2

| Example | II | III | IV |
| --- | --- | --- | --- |
| Screw speed, RPM | 10.0 | 10.0 | 10.0 |
| Output rate, kg/hr | 2.3 | 2.3 | 2.2 |
| Temperature at the 2nd zone, ° C. | 240 | 250 | 260 |
| Temperature at the die, ° C. | 180 | 180 | 180 |
| Foam density, kg/m$^3$ | 630 | 380 | 190 |
| Average cell size, $\mu$m | 60 | 70 | 80 |

EXAMPLE V–VII

These Examples show the effect of screw speed on the foaming process.

In these Examples, compound B was fed to the same extruder as described in Example 2. This time, the screw speed was varied from 10.0 rpm to 17.1 rpm. The circular die used had a diameter of 2 mm. The conditions and the results are given in Table 3. It was found that the screw speed effected the foam density of the extruded profile. At the higher screw speed, the amount of water released was reduced since the residence time of the compound B in the extruder was shortened, and thus the density of the foam was increased. It is, therefore, indicated that the temperature profile and the screw speed can be adjusted in order to achieve a foamed profile with a controlled density. The adjustments should be made depending on the die geometry, the extruder and screw designs, and the pressure profile.

TABLE 3

| Run | V | VI | VII |
| --- | --- | --- | --- |
| Screw speed, RPM | 10.0 | 13.7 | 17.1 |
| Output rate, kg/hr | 2.3 | 3.1 | 4.0 |
| Temperature at the 2nd | 250 | 250 | 250 |

TABLE 3-continued

| Run | V | VI | VII |
|---|---|---|---|
| zone, °C. | | | |
| Temperature at the die, °C. | 180 | 180 | 180 |
| Foam density, kg/m³ | 510 | 560 | 610 |

EXAMPLES VIII–X

Table 4 shows examples of foams produced using a circular die and rectangular dies.

In these Examples, compound B was fed to the same extruder as described in Example 2. The circular die had a diameter of 2.4 mm. Two rectangular dies having a geometry shown as in Table 4 were used. In Example X a static mixer with a length of 597 mm was attached to the extruder. The use of such a static mixer increased the residence time of compound B and provided sufficient cooling of the melt.

TABLE 4

| Example | VIII | IX | X |
|---|---|---|---|
| Screw speed, RPM | 10.0 | 10 | 20.4 |
| Output rate, kg/hr | 2.3 | 2.3 | 3.1 |
| Die geometry | Circular die diameter 2.4 mm | Slit die 1.27 mm × 3.56 mm | Slit die 1.27 mm × 6.35 mm |
| Static mixer | not attached | not attached | attached |
| Temperature at the die, °C. | 175 | 175 | 175 |
| Foam density, kg/m³ | 130 | 220 | 150 |

EXAMPLE XI–XIV (Foams made using TPE's of different hardness)

A Ferro Continuous Mixer and a 34 mm intermeshing corotating twin screw extruder were used to mix a Sarlinko thermoplastic elastomer (70 wt. %) with ATH powder (9 gm average size, vinylsilane treated, 432-SP from J.M. Huber Corp.) (30 wt. %) at a melt temperature of 200° C. The resulting mixtures were used in the following foaming examples. The thermoplastic elastomers were blends of polypropylene and phenolic cured EPDM rubber (TPOEV) in ratios of 70/30, 63/37, 55/45, and 52/48 by weight respectively. The TPOEV had an amount of extractable rubber (in boiling xylene) of about 6–10% in all the thermoplastic elastomers used in all the examples.

A three-zone single screw extruder equipped with a general purpose screw was used in the following foaming examples. The extruder had a diameter of 38.1 mm and a length to diameter ratio (L/D) of 24/1. A circular die with a diameter of 2.4 mm was used. The TPV/ATH mixtures were fed to the extruder at a rate of 2.2 to 2.4 kilograms per hour.

As shown in Table 5, low density foamed samples were obtained with TPV/ATH mixtures having different rubber to plastic ratios (i.e. different hardness). It was found that the foaming process was very stable and easy to control for all the TPV/ATH mixtures even with an extruder having a 24 L/D ratio. The foamed samples showed fine and uniform cell structures. The surface of the foamed strand was very smooth.

TABLE 5

| Examples | XI | XII | XIII | XIV |
|---|---|---|---|---|
| EPDM/PP ratio by weight | 70/30 | 63/37 | 55/45 | 52/48 |
| Screw speed, RPM | 10 | 10 | 10 | 10 |
| Temp. at the 1st zone, °C. | 200 | 200 | 200 | 200 |
| Temp. at the 2nd zone, °C. | 265 | 264 | 254 | 254 |
| Temp. at the 3rd zone, °C. | 165 | 165 | 165 | 165 |
| Temp. at the die, °C. | 175 | 175 | 175 | 175 |
| Foam density, kg/m³ | 202 | 217 | 235 | 186 |
| Tensile strength of foam, MPa | 0.53 | 0.78 | 1.30 | 1.13 |
| Elongation at break, % | 110 | 148 | 113 | 114 |

EXAMPLES XV–XXVI (Effect of ATH surface treatment)

These examples show the effect of ATH surface treatment on the cell structure of foamed samples.

In these examples, a Sarlink® TPOEV thermoplastic elastomer having an EPDM/PP ratio of 63/37 by weight was mixed with untreated and surface treated ATH powder (from J.M. Huber Corp.) at a ratio of 70/30 by weight using a 34 mm intermeshing corotating twin screw extruder at a melt temperature of 200° C. The foamability of the resulting mixtures was tested using the same extruder and the same die described in Examples XI–XIV. The cell structure of the foamed samples was analyzed using an Olympus BX60 optical microscope equipped with an image capturing device. The size of the cells was determined using the pictures taken under the microscope in the cross sectional direction of the foamed specimen. As can be seen from Table 6, the foamed samples made with TPV/ATH mixture containing vinyl silane treated ATH showed smaller cell size and narrower cell size distribution than the other foamed samples containing untreated and surfactant treated ATH's. Vinylsilane could act as a coupling agent between the WCC particles and the polyolefin matrix improving the interfacial bond strength. It may also initiate low degree of cross linking reactions in the polyolefin phase surrounding the WCC particles, which improves the melt strength and stabilizes the cell growth during the foaming process.

TABLE 6

| Examples | Density (kg/m³) | ATH Grade | Type of ATH | Cell size smallest-largest (μm) | Delta size (#m) |
|---|---|---|---|---|---|
| XV | 202 | M632 | 3.5 μm, untreated | 100–350 | 250 |
| XVI | 203 | 632-SP | 3.5 μm, vinylsilane treated | 80–200 | 120 |
| XVII | 260 | M632 | 3.5 μm, untreated | 100–300 | 200 |
| XVIII | 264 | 632-SP | 3.5 μm, vinylsilane treated | 150–250 | 100 |
| XIX | 366 | M632 | 3.5 μm, untreated | 100–250 | 150 |
| XX | 360 | 632-SP | 3.5 μm, vinylsilane treated | 100–200 | 100 |
| XXI | 220 | SB-432 | 9.0 μm, untreated | 100–250 | 150 |
| XXII | 225 | 432-SP | 9.0 μm, vinylsilane treated | 80–200 | 120 |
| XXIII | 238 | 432-CM | 9.0 μm, surfactant treated | 100–300 | 200 |
| XXIV | 377 | SB-432 | 9.0 μm, untreated | 50–150 | 100 |

TABLE 6-continued

| Examples | Density (kg/m³) | ATH Grade | Type of ATH | Cell size smallest-largest (μm) | Delta size (#m) |
|---|---|---|---|---|---|
| XXV | 374 | 432-SP | 9.0 μm, vinylsilane treated | 80–150 | 70 |
| XXVI | 428 | 432-CM | 9.0 μm, surfactant treated | 50–200 | 150 |

EXAMPLES XXVII–XXIX
(Scale up foaming process using a rod die)

A Sarlink® TPOEV having an EPDM/PP ratio of 63/37 by weight was mixed with ATH powder (9 μm average size, vinylsilane treated, 432-SP from J.M. Huber Corp.) at a ratio of 70/30 by weight using a Ferro Continuous Mixer at a melt temperature of 200° C. The resulting mixture was fed to a 63.5 mm single screw extruder of L/D 24/1 at a rate of 22.3 kg/hr. A low work barrier screw and a circular die with a diameter of 4.4 mm were used in the following examples.

TABLE 7

| Examples | XXVII | XXVIII | XXIX |
|---|---|---|---|
| Screw speed, RPM | 14 | 14 | 14 |
| Temp. at the 1st zone, ° C. | 191 | 191 | 191 |
| Temp. at the 2nd zone, ° C. | 238 | 254 | 260 |
| Temp. at the 3rd zone, ° C. | 260 | 274 | 285 |
| Temp. at the 4th zone, ° C. | 166 | 166 | 166 |
| Die temperature, ° C. | 180 | 180 | 180 |
| Foam density, kg/m³ | 450 | 300 | 200 |
| Foam diameter, mm | 8.3 | 9.3 | 9.1 |
| Tensile strength of the foam, MPa | 1.43 | 0.96 | 0.68 |
| Elongation at break, % | 386 | 310 | 167 |
| Compression set, % 22 hr @ 70° C. (50% deflection) | 32.2 | 35.3 | 39.0 |

As shown in Table 7, a series of different foamed samples were obtained by simply changing the temperature at the second and third zones of the extruder. The higher the temperatures at the second and third zones were set, the lower the density of the foam sample became.

EXAMPLES XXX–XXXIII
(Scale up foaming process using a tube die)

The same TPV/ATH mixture as used in Examples XXVII–XXIX was fed to 63.5 mm single screw extruder of L/D 24/1 at a rate of 22.5–23.8 kg/hr. A low work barrier screw and a tube die with an internal diameter of 4.4. mm and an outer diameter of 6.3 mm were used in the following examples.

As shown in Table 8, foamed tube samples of different densities were obtained by changing the temperature settings at the second and third zones of the extruder. The foaming process was found to be very stable and very easy to control. All the foamed samples showed very fine cell structure and very smooth surface.

TABLE 8

| Examples | XXX | XXXI | XXXII | XXXIII |
|---|---|---|---|---|
| Screw speed, RPM | 15.2 | 15.2 | 15.2 | 15.2 |
| Temp. at the 1st zone, ° C. | 199 | 199 | 199 | 199 |
| Temp. at the 2nd zone, ° C. | 221 | 238 | 249 | 254 |
| Temp. at the 3rd zone, ° C. | 254 | 260 | 274 | 279 |
| Temp. at the 4th zone, ° C. | 166 | 166 | 166 | 166 |
| Die temperature, ° C. | 177 | 177 | 177 | 177 |
| Foam density, kg/m³ | 840 | 660 | 500 | 410 |
| Foam outer diameter, mm | 8.4 | 8.7 | 9.7 | 9.6 |
| Foam inner diameter, mm | 6.0 | 6.1 | 6.5 | 6.2 |
| Tensile strength of the foam, MPa | 3.2 | 2.6 | 1.7 | 1.5 |
| Elongation at break, % | 528 | 576 | 501 | 544 |
| Compr. load deflection, 50% deflection, N/20 cm | 16.4 | 12.8 | 9.8 | 8.9 |
| 25% deflection, N/20 cm | 10.1 | 6.5 | 5.6 | 5.4 |

EXAMPLES XXXIV–XXXVII
(Foaming process using a blow molding machine)

The foamability of the TPV/ATH mixture used in Examples XXVII–XXIX was tested using a two-layer X-Y Placo extrusion blow molding machine equipped with an accumulator and a parison die of adjustable clearance. The parison die had an outer diameter of 35 mm.

As can be seen from Table 9, foamed tube parisons were obtained using a sequential extrusion blow molding machine. The foamed parison samples showed fine cell structure and fairly smooth internal and external surfaces. It was found also during the experiment that it was possible to blow the foamed parisons to a certain ratio.

TABLE 9

| Examples | XXXIV | XXXV | XXXVI | XXXVII |
|---|---|---|---|---|
| Screw speed of the extruder, RPM | 20 | 20 | 40 | 60 |
| Temp. at the 1st zone of the extruder, ° C. | 199 | 199 | 199 | 199 |
| Temp. at the 2nd zone of the extruder, ° C. | 232 | 243 | 243 | 243 |
| Temp. at the 3rd zone of the extruder, ° C. | 204 | 204 | 204 | 204 |
| Adapter temperature, ° C. | 188 | 188 | 188 | 188 |
| Accumulator temperature, ° C. | 182 | 182 | 182 | 182 |
| Die temperature, ° C. | 182 | 182 | 171 | 171 |
| Die gap, mm | 0.50 | 0.50 | 0.80 | 0.80 |
| Foam outer diameter, mm | 54.6 | 51.4 | 54.0 | 54.4 |
| Foam tube thickness, mm | 1.5 | 1.8 | 2.0 | 1.9 |
| Foam density, kg/m³ | 840 | 640 | 530 | 570 |
| Tensile strength of foam in machine direction, MPa | 2.3 | 1.3 | 1.3 | 1.5 |
| Elongation at break in machine direction % | 508 | 257 | 397 | 423 |

EXAMPLE XXXVIII
(CylaCell-PA as a chemical blowing agent)

CylaCell-PA (from CYLATEC, Inc.) is a disperging and processing aid containing sodium and magnesium silicate, and sodiumborate, and chemically bond water. The following example shows the possibility of using CylaCell-PA as a chemical blowing agent to foam thermoplastic elastomers.

The thermoplastic elastomer used in Examples XXVII–XXIX was first coated with mineral oil and later mixed with CylaCell-PA at a ratio of 85/1/14 by weight (thermoplastic elastomer/mineral oil/CylaCell-PA). The foamability of the resulting mixture was tested using the same extruder and the same die described in Examples XI–XIV. As shown in Table 10, low density foam was obtained with CylaCell-PA as a chemical blowing agent. The foamed strand was found to have fine and uniform cell structure and very smooth surface.

TABLE 10

| Example | XXXVIII |
| --- | --- |
| Screw speed, RPM | 15 |
| Temp. at the 1st zone, ° C. | 140 |
| Temp. at the 2nd zone, ° C. | 185 |
| Temp. at the 3rd zone, ° C. | 165 |
| Die temperature, ° C. | 175 |
| Foam density, kg/m$^3$ | 250 |

What is claimed is:

1. Process for preparing a foamed thermoplastic article, comprising:
   a) heating a mixture comprising a thermoplastic polyolefin elastomer vulcanizate and an effective amount of a water releasing chemical compound, to a temperature at which the water releasing chemical compound releases water, wherein said temperature is above the melting point of the thermoplastic polyolefin elastomer vulcanizate; and
   b) releasing the resulting heated mixture to atmospheric conditions;
   wherein said polyolefim elastomer vulcanizate comprises a polyolefin resin and a rubber dispersed in said resin and wherein said rubber has a degree of vulcanization such that the amount of extractable rubber is less ban 90% in boiling xylene.

2. Process according to claim 1, characterized in that the thermoplastic resin in the thermoplastic polyolefin elastomer is selected from the group consisting of polyethylene and polypropylene homo-and copolymers.

3. Process according to claim 1, characterized in that the mixing of the thermoplastic polyolefin elastomer with the water releasing chemical compound takes place at a temperature within the range of 10–250° C. and that the water is released at a temperature within the range from 120–350° C.

4. Process according to claim 1, characterized in that the water releasing chemical compound is at least one of aluminum trihydrate and magnesium hydroxide.

5. Process according to claim 1, characterized in that the amount of released water is in the range of 0.1 to 5 wt. %, relative to the thermoplastic polyolefin elastomer.

6. Process according to claim 1, characterized in that the water releasing chemical compound is surface treated with a compound, selected from the group comprising of an organosilicon compound, an organotitanate, an organo aluminate and an organozirconate coupling agent.

7. Process according to claim 6, characterized in that the organosilicon compound is an alkoxy- or acetoxy silane.

8. Process according to claim 6, characterized in that the organosilicon compound is a vinylsilane.

9. Process according to claim 7, characterized in that the organosilicon compound is a vinylalkoxysilane.

10. Process according to claim 1, characterized in that the thermoplastic polyolefin elastomer is vulcanized to the extend, that the amount of extractable rubber is less than 15%.

11. Process according to claim 1, characterized in that the rubber in the thermoplastic polyolefin elastomer is at least one of EP(D)M-rubber, NBR, SBR and butyl rubber.

12. Process according to claim 1, characterized in that the water releasing chemical compound used is an organic diacid.

13. Process according to claim 1, characterized in that water is generated through a polycondensation of the water releasing chemical compound.

14. Process according to claim 1, characterized in that the mixture of the thermoplastic polyolefin elastomer with the water releasing chemical compound is a dry blend.

15. Process according to claim 1, wherein the mixture of thermoplastic polyolefin elastomer and the water releasing chemical compound is obtained by mixing the thermoplastic polyolefin elastomer with the water releasing chemical compound at the temperature above the melting point of the thermoplastic polyolefin elastomer, and below the temperature at which the water releasing chemical compound releases water.

16. Process according to claim 1, characterized in that the process is performed in an extruder.

17. a foamable polymeric composition comprising a thermoplastic polyolefin elastomer, and an effective amount of water releasing chemical compound, wherein said polyolefin elastomer comprises a polyolefin resin and a rubber dispersed in said resin, and wherein said rubber has a degree of vulcanization such that the amount of extractable rubber is less than 90% in boiling xylene.

18. Foamed thermoplastic article, prepared by foaming a composition comprising a thermoplastic polyolefin elastomer and an effective amount of water releasing chemical compound, wherein said polyolefin elastomer comprises a polyolefin resin and a rubber dispersed in said resin, and wherein said rubber has a degree of vulcanization such that the amount of extractable rubber is less than 90% in boiling xylene.

19. Foamed thermoplastic article, obtainable by a process according to claim 1.

20. Foamable polymeric composition according to claim 17, characterized in that the thermoplastic resin in the thermoplastic polyolefim elastomer is selected from the group consisting of polyethylene and polypropylene homo- and copolymers.

21. Foamable polymeric composition according to claim 17, characterized in that the water releasing chemical compound is selected from the group consisting of aluminum trihydrate and magnesium hydroxide.

22. Foamable polymeric composition according to claim 17, characterized in that the water releasing chemical compound is surface treated with a surface coating selected from the group comprising silane, organotitanates, organoaluminate and organozirconate compounds.

23. Foamable polymeric composition according to claim 22, characterized in that the thermoplastic polyolefin elastomer is vulcanized to the extent, that the amount of extractable rubber is less than 15%.

24. Foamable polymeric composition according to claim 17, characterized in that the rubber in the thermoplastic polyolefin elastomer is selected from the group consisting of EP(D)M-rubber, NBR, SBR and butyl rubber.

25. Foamable polymeric composition according to claim 17, characterized in that the water releasing chemical compound used is an organic diacid.

26. Foamable polymeric composition according to claim 17, characterized in that water is generated through a polycondensation of the water releasing chemical compound.

27. Foamed thermoplastic article according to claim 18, characterized in that the article has a density in the range of 50–900 kg/m$^3$.

28. Foamed thermoplastic article according to claim 18, characterized in that the thermoplastic resin in the thermoplastic elastomer is selected from the group consisting of polyethylene and polypropylene homo-and copolymers.

29. Foamed thermoplastic article according to claim 18, characterized the in that the water releasing chemical compound in selected from the group consisting of aluminum trihydrate and magnesium hydroxide.

* * * * *